(No Model.)
W. STILLMAN, Jr.
BICYCLE.
No. 456,387. Patented July 21, 1891.
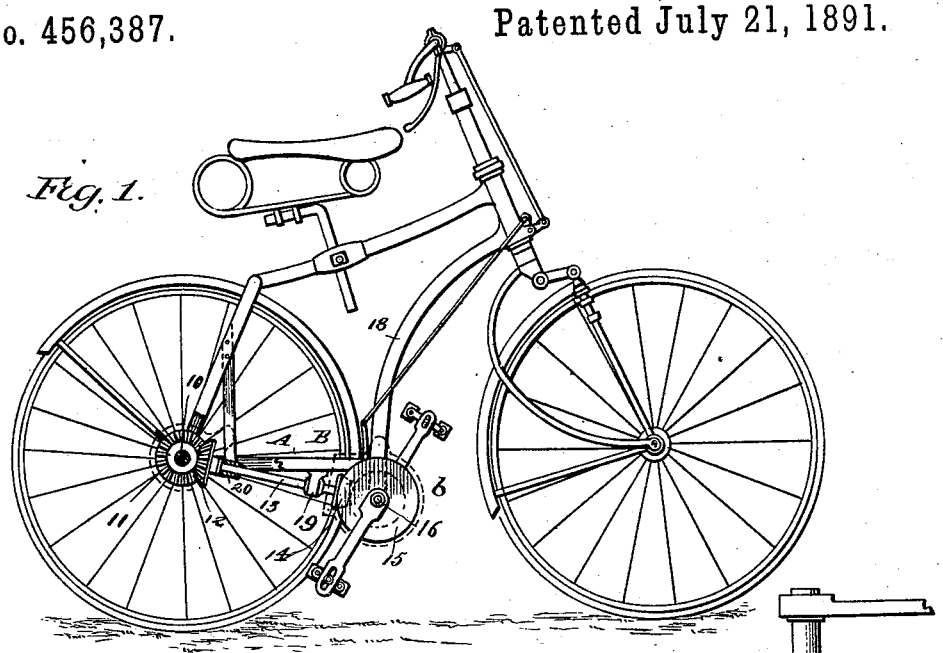
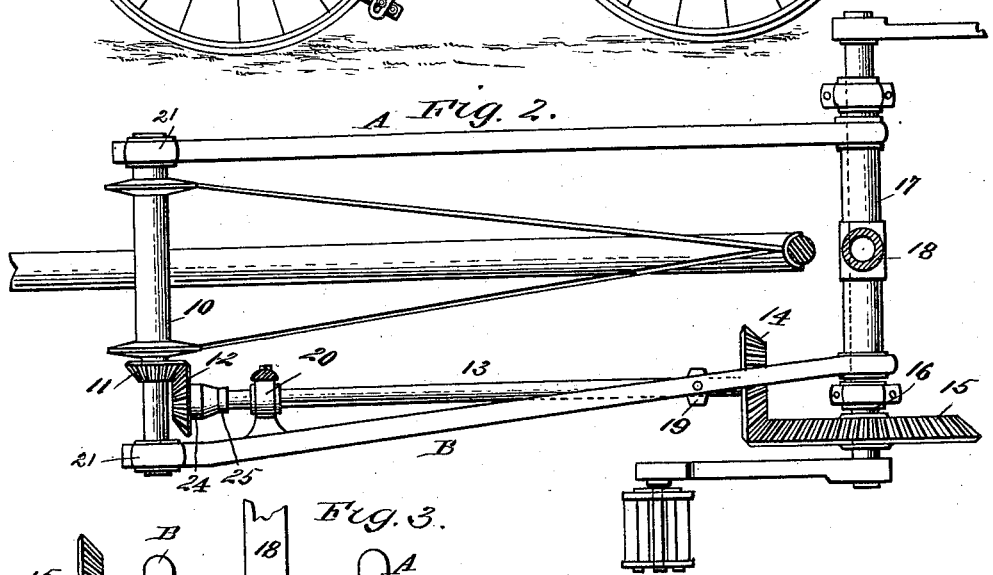
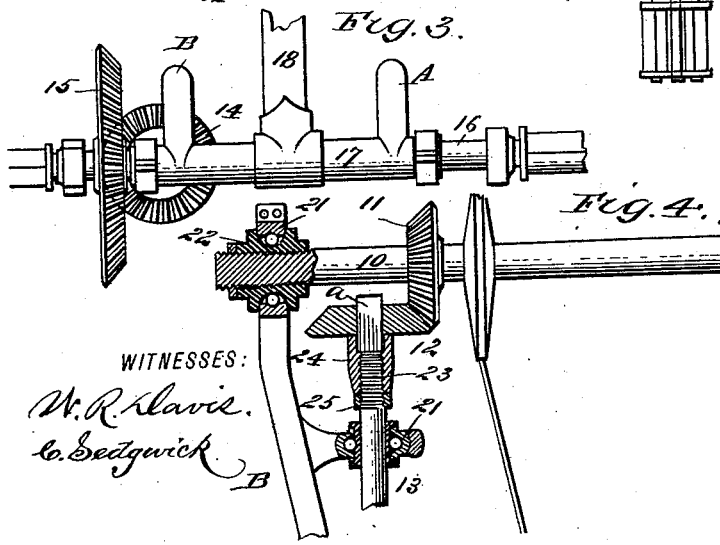
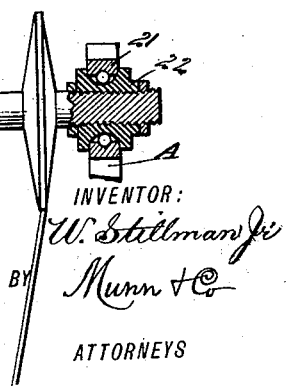
WITNESSES:
W. R. Davis.
C. Sedgwick.
INVENTOR:
W. Stillman Jr.
BY Munn & Co
ATTORNEYS

UNITED STATES PATENT OFFICE.

WALTER STILLMAN, JR., OF CLOSTER, NEW JERSEY.

BICYCLE.

SPECIFICATION forming part of Letters Patent No. 456,387, dated July 21, 1891.

Application filed October 10, 1890. Serial No. 367,678. (No model.)

*To all whom it may concern:*

Be it known that I, WALTER STILLMAN, Jr., of Closter, in the county of Bergen and State of New Jersey, have invented a new and useful Improvement in Driving Mechanisms for Bicyles and Similar Machines, of which the following is a full, clear, and exact description.

My invention is an improvement in the class of "Safety" bicycles which are driven by shaft and gear instead of a chain and sprocket gear.

Reference is to be had to the accompanying drawings, forming a part of this specification, in which similar figures and letters of reference indicate corresponding parts in all the views.

Figure 1 is a side elevation of the driving mechanism illustrated as applied to a "Safety" bicycle. Fig. 2 is a plan view of the mechanism. Fig. 3 is a front elevation of the pedal-shaft of the bicycle and an end view of the driving mechanism; and Fig. 4 is a plan view of one end of the driving mechanism and the axle of the driving-wheel of the bicycle, a portion of the mechanism and a portion of the axle being represented in section.

Upon the axle 10 of the driving-wheel a bevel-gear 11 is securely attached, the said gear being located as near as practicable to the hub of the wheel. The gear 11 meshes with a similar or larger gear 12, attached to one end of a horizontal drive-shaft 13, the opposite end of the shaft 13 being also provided with a bevel-gear 14, which gear meshes with a large gear 15, fast upon the pedal-shaft 16.

The rear frame of the bicycle is represented as consisting of two bars A and B, which bars are connected with the axle 10 of the driving-wheel and the pedal-shaft 16. The pedal-shaft 16 passes through a sleeve 17, with which sleeve the backbone 18 of the vehicle is connected in any suitable or approved manner. The gear 15 is secured to the pedal-shaft between one of the pedals and the contiguous bar B of the frame. The bar B is bent inward, so as to cross the shaft 13 near the forward end of the latter, and the said shaft 13 is supported near its forward end in a vertical hanger 19, extending downward from the frame-bar B, and at its rear end the said shaft is likewise supported in a horizontal hanger 20, extending from the inner face of said bar B, as is best shown in Fig. 2. The bearings 21 in the hangers 19 and 20 are ball-bearings, as shown in Fig. 4, and the bearings of the axle of the drive-wheel are also ball-bearings. In order to prevent the driving mechanism from spreading the frame upon the axle of the drive-wheel, the sleeve 21 of the bars A and B, encircling the bearing-boxes 22, which may be attached to the axle 10, are fitted in a groove produced in the bearing-boxes, as best shown in Fig. 2; but if in practice it be desired the outward thrust of the frame may be overcome in any other approved manner. It will be observed that by locating the hangers 19 and 20, as shown, the drive-shaft 13 is braced effectually at each end and is prevented also from running out of true.

In the drawings the gear 15 is the largest gear, and the gear 14, meshing therewith, is about one-half of its size. The gear 12, as shown in Fig. 4, is adjustable upon the drive-shaft, as the drive-shaft at its rear end is made square or polygonal, as shown at $a$, and the opening in the gear 12 is of like shape. Forward of the polygonal end $a$ of the drive-shaft a thread 23 is formed thereon, upon which thread a sleeve 24 is secured, and a check-nut 25, the sleeve engaging with the gear 12 and the check-nut with the sleeve. Thus any wear caused by the constant engagement of the bevel-gears may be taken up by manipulating the sleeve 24 and the check-nut 25.

The gears may be of any desired size to impart to the machine the required speed. If the driving-wheel is thirty inches and the gears 11, 12, and 14 each two inches in diameter and the gear-wheel 15 four inches in diameter, then one revolution of the pedals will cause the driving-wheel to make two revolutions, which is equal to one revolution of a sixty-inch wheel.

It is evident that the driving mechanism is simple and durable, and that it may be readily and economically applied to any form of bicycle or tricycle. It is further evident that the guard, one of which is shown at $b$ in dotted lines, Fig. 1, may be made to effectually cover the mechanism; also, that as compared with the chain driving-belt ordinarily employed the improved driving mechanism produces but little friction. It is likewise obvious that the frame of the machine need not be constructed in as many sections as heretofore, because the adjustment of the driving mechanism is contained in itself and does not need the co-operation of the frame, thus enabling the frame to be made more durable and solid.

Having thus described my invention, I claim as new and desire to secure by Letters Patent—

In a bicycle, the combination, with the pedal-shaft, the axle of the drive-wheel, a bevel-gear secured to the axle, and a larger bevel-gear secured to the pedal-shaft, of a drive-shaft provided with a bevel-gear at one end meshing with the bevel-gear of the pedal-shaft, the opposite end of the shaft being polygonal in cross-section and threaded at said polygonal portion, a bevel-gear loosely fitted upon the polygonal portion of the shaft, a sleeve and check-nut located upon the threaded portion of the shaft, the sleeve engaging with the gear and the check-nut with the sleeve, as and for the purpose specified.

WALTER STILLMAN, JR.

Witnesses:
J. FRED. ACKER,
E. M. CLARK.